US011039633B2

(12) United States Patent
Lynch et al.

(10) Patent No.: US 11,039,633 B2
(45) Date of Patent: *Jun. 22, 2021

(54) NUTRITIONALLY ENHANCED ISOLATE FROM STABILIZED RICE BRAN AND METHOD OF PRODUCTION

(71) Applicant: QJV, LLC, St. Louis, MO (US)

(72) Inventors: Ike E. Lynch, Rupert, ID (US); Glenn H. Sullivan, Carmel, IN (US); Larry R. Miller, Centreville, MD (US)

(73) Assignee: QJV, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/271,425

(22) Filed: Feb. 8, 2019

(65) Prior Publication Data

US 2019/0166891 A1    Jun. 6, 2019

Related U.S. Application Data

(63) Continuation of application No. 14/573,688, filed on Dec. 17, 2014, now Pat. No. 10,238,134, which is a continuation of application No. 12/882,202, filed on Sep. 15, 2010, now Pat. No. 8,945,642.

(51) Int. Cl.
| | |
|---|---|
| A23L 7/10 | (2016.01) |
| A23L 29/30 | (2016.01) |
| A23L 7/104 | (2016.01) |
| A23L 33/105 | (2016.01) |
| A23D 9/00 | (2006.01) |
| C11B 1/02 | (2006.01) |

(52) U.S. Cl.
CPC ............... *A23L 7/115* (2016.08); *A23D 9/00* (2013.01); *A23L 7/104* (2016.08); *A23L 7/107* (2016.08); *A23L 29/35* (2016.08); *A23L 33/105* (2016.08); *C11B 1/025* (2013.01); *A23V 2002/00* (2013.01)

(58) Field of Classification Search
CPC .......... A23L 7/115; A23L 7/104; A23L 7/107; A23L 29/35
USPC ........................................................ 426/52
See application file for complete search history.

(56) References Cited

U.S. PATENT DOCUMENTS

| | | |
|---|---|---|
| 5,985,344 A | 11/1999 | Cherukuri |
| 6,126,943 A | 10/2000 | Cheruvanky |
| 6,303,586 B1 | 10/2001 | McPeak |
| 6,350,473 B1 | 2/2002 | Cheruvanky |
| 6,558,714 B2 | 5/2003 | Cheruvanky |
| 6,733,799 B2 | 5/2004 | Cheruvanky |
| 6,902,739 B2 | 6/2005 | McPeak |
| 8,945,642 B2 | 2/2015 | Lynch et al. |
| 2008/0038385 A1 | 2/2008 | Cherukuri |
| 2009/0162514 A1 | 6/2009 | Gingras |
| 2009/0191308 A1 | 7/2009 | Gingras et al. |
| 2009/0220666 A1 | 9/2009 | Gingras |
| 2009/0285919 A1 | 11/2009 | Alberte et al. |
| 2010/0015258 A1 | 1/2010 | Alberte et al. |

FOREIGN PATENT DOCUMENTS

| | | |
|---|---|---|
| WO | 2009109703 | 9/2009 |
| WO | 2009143064 | 11/2009 |
| WO | 2009143065 | 11/2009 |

OTHER PUBLICATIONS

Sharma, A. et al. 2001. Enzyme assisted aqueous extraction of rice bran oil. JAOCS. 78: 949-951.
Hanmoungjai, P. et al. 2002. Enzyme-assisted water-extraction of oil and protein from rice bran. J. Chem. Tech. Biotech. 77:771-776.
Xianli Wu et al., in the Journal of Food Composition and Analysis 17 (2004) at pp. 407-422.
Qureshi, AA. et al, 'Effects of stabilized rice bran, its soluble and fiber fractions, on blood glucose levels and serum lipid parameters in humans with diabetes mellitus Types I and II', Journal of Nutritional Biochemistry (2002) 13:175-187.
Lynch, et al, How Does Diabatrol® Work?, White Paper, Jan. 8, 2010.

*Primary Examiner* — Hamid R Badr
(74) *Attorney, Agent, or Firm* — McAndrews, Held & Malloy, Ltd.

(57) ABSTRACT

Provided is a nutritionally enhanced derivative (isolate) from Stabilized Rice Bran (SRB) with improved antioxidant, fat and protein levels enhancing both the nutritional and yield values over existing techniques. Also provided is an improved method that utilizes certain enzyme combinations under various time and temperature conditions for extracting these nutritionally enhanced isolates from SRB.

6 Claims, No Drawings

NUTRITIONALLY ENHANCED ISOLATE FROM STABILIZED RICE BRAN AND METHOD OF PRODUCTION

CROSS-REFERENCE TO RELATED APPLICATIONS

The present application is a continuation application of U.S. patent application Ser. No. 14/573,688, filed Dec. 17, 2014, which is a continuation application of U.S. patent application Ser. No. 12/882,202, filed Sep. 15, 2010. The entire text of the aforementioned applications is incorporated herein by reference in its entirety.

FEDERALLY SPONSORED RESEARCH OR DEVELOPMENT

None.

TECHNICAL FIELD

The present invention relates to a process of producing a nutritionally enhanced derivative (isolate) from Stabilized Rice Bran (SRB) with improved yield characteristics.

BACKGROUND

Rice bran is a nutrient-dense composition derived from the milling of rice. Rice bran is a rich source of protein, fat, carbohydrate and a number of micronutrients such as vitamins, minerals, anti-oxidants and phytosterols. To be useful as a food ingredient, rice bran must be stabilized. That is, the lipid hydrolyzing and oxidizing enzymes present in the bran must be inactivated in order to prevent interaction of those enzymes, lipase and peroxidase in particular, with the oil fraction. If these enzymes are not inactivated, hydrolytic and oxidative rancidity will proceed, causing the formation of objectionable odors and flavors commonly associated with rancidity. Once stabilized however, rice bran serves as a dietary nutrient useful in a variety of food and beverage formulations.

The nutritional value of Stabilized Rice Bran (SRB) has been well recognized. Use of SRB in treatment of a number of human ailments, such as diabetes, coronary diseases, arthritis, and cancer, have been described in the following U.S. Patents and published patent applications including: U.S. Pat. No. 5,985,344, issued Nov. 16, 1999, entitled, "Process for Obtaining Micronutrient Enriched Rice Bran Oil;" U.S. Pat. No. 6,126,943, issued Oct. 3, 2000, and entitled, "Method for Treating Hypercholesterolemia, Hyperlipidemia, and Atherosclerosis," U.S. Pat. No. 6,303,586 issued Oct. 16, 2001, and entitled "Supportive Therapy for Diabetes, Hyperglycemia and Hypoglycemia;" U.S. Pat. No. 6,350,473, issued Feb. 26, 2002 and entitled "Method for Treating Hypercholesterolemia, Hyperlipidemia, and Atherosclerosis;" U.S. Pat. No. 6,558,714, issued May 6, 2003, and entitled "Method for Treating Hypercholesterolemia, Hyperlipidemia, and Atherosclerosis;" U.S. Pat. No. 6,733,799 issued May 11, 2004, and entitled "Method for Treating Hypercholesterolemia, Hyperlipidemia, and Atherosclerosis;" and U.S. Pat. No. 6,902,739, issued Jun. 7, 2005, and entitled "Method for Treating Joint Inflammation, Pain, and Loss of Mobility," and U.S. Patent Application Publication US 2008/0038385 entitled "Therapeutic uses of an anti-cancer composition derived from rice bran." Additional utilizations of SRB have been described in U.S. Patent Application Publication US 2009/0285919 entitled "Rice Bran Extracts for Inflammation and Methods of Use Thereof;" U.S. Patent Application Publication US 2009/0220666 entitled "Utilization of Stabilized Bran in High Protein Products;" U.S. Patent Application Publication US 2009/0191308 entitled "Method of Preparing Emulsified Cereal Bran Derivatives;" and U.S. Patent Application Publication US 2009/0162514 entitled "Production of Pasta Using Rice Bran and Rice Flour." Each and every one of the foregoing patents and published patent applications are hereby incorporated by reference in their entireties for all that they teach and describe.

The nutrients in SRB are preferably extracted into a concentrated isolate for use in commercial food and beverage formulations. However, existing processes for the production of SRB derivatives provide inefficient yields and limited nutritional profiles compared to the potential available in SRB. Specifically, the enzyme alpha-amylase has been used to treat an aqueous slurry of SRB to convert the starch component of the SRB into a dextrin slurry that can be isolated by centrifugation and subsequent drying. However, the resulting dextrin product typically represents only forty to fifty percent of the starting weight of the SRB, and unlike nutrient-rich SRB, the dextrin product has a limited nutritional profile and is low in protein and antioxidant rich fat content. Not only is protein and fat needed for basic nutrition, the fat content in SRB has special qualities that can be maximized to ehhance the nutraceutical nutritional value of the dextrin isolate. Specifically, the fat/oil component of SRB is dense with numerous antioxidants that provide SRB with an extremely high nutraceutical nutritional capacity. In most instances the antioxidant capacity of SRB is several magnitudes higher than foods more commonly known to be high in antioxidants. For instance, Xianli Wu et al., in the Journal of Food Composition and Analysis 17 (2004) at pages 407-422 (incorporated herein by reference), listed total antioxidant capacity (hydrophilic and lipophylic $ORAC_{FL}$) of 28 selected foods. When compared to rice bran, with results expressed as µmol Trolox Equivalents (TE) per gram fresh weight (FW), the Lipophilic antioxidant capacity of rice bran measured 155, while the next highest food, avocado, measured less than 6. When more fully extracted scientific evidence suggests that such antioxidants can have numerous health benefits. For example, certain SRB derivatives have shown potential for lowering and stabilizing blood glucose in Type 2 diabetics, as described in Qureshi, A. A. et al, 'Effects of stabilized rice bran, its soluble and fiber fractions, on blood glucose levels and serum lipid parameters in humans with diabetes mellitus Types I and II', Journal of Nutritional Biochemistry, 2002, 13:175-187 (incorporated herein by reference). Thus, a need exists for an improved method of extracting enhanced nutritional potency from the SRB to increase the yield of the isolate and improve its nutraceutical nutritional profile, especially its yield of protein and antioxidant-rich fat.

SUMMARY

Provided is a nutritionally enhanced derivative (isolate) from SRB with improved yield characteristics and method for producing same.

In certain embodiments, a nutritionally enhanced isolate of Stabilized Rice Bran is provided, which is prepared by a process comprising the steps of: providing a Stabilized Rice Bran material; adding water to the Stabilized Rice Bran material to produce a slurry including an insoluble fiber fraction; adding a beta-glucanase enzyme to the slurry; heating the slurry sufficiently to activate the beta-glucanase enzyme to release fat components from the insoluble fiber fraction into a soluble fat fraction; and isolating the soluble fat fraction.

The nutritionally enhanced isolate of Stabilized Rice Bran may then, in certain embodiments, be further prepared by a process further comprising the steps of: adding a protease enzyme to the slurry; heating the slurry sufficiently to activate the protease enzyme to create a soluble protein fraction from the Stabilized Rice Bran material; and isolating the soluble protein fraction.

Further, the nutritionally enhanced isolate of Stabilized Rice Bran may in certain embodiments be prepared by a process further comprising the steps of: adding an alpha amylase enzyme to the slurry; heating the slurry sufficiently to activate the alpha amylase enzyme to convert starch in the Stabilized Rice Bran material into a soluble dextrin fraction; and isolating the soluble dextrin fraction.

The nutritionally enhanced isolate of Stabilized Rice Bran may in certain embodiments be prepared by a process further comprising the steps of: heating the slurry to a first temperature for a first time period; and heating the slurry to a second temperature for a second time period. In various embodiments, the first temperature may be selected from a range of about 50° C. to 110° C., for instance, in certain embodiments from a range of about 57° C. to 97° C. In various embodiments, the first time period may be no less than about 1 minute and no more than about 120 minutes, for instance, in certain embodiments no less than about 15 minutes and no more than about 45 minutes. In various embodiments the second temperature may be selected from a range of about 50° C. to 110° C., for instance, in certain embodiments from a range of about 68° C. to 108° C. In various embodiments, the second time period may be no less than about 1 minute and no more than about 120 minutes, for instance, in certain embodiments from no less than about 1 minute and no more than about 10 minutes. The slurry may in various embodiments have a pH selected from a range of about 3.0 to about 7.5, for instance, in certain embodiments from a range of about 6.0 to about 7.0.

In certain embodiments, a nutritionally enhanced isolate of Stabilized Rice Bran is provided, which is prepared by a process comprising the steps of: providing a Stabilized Rice Bran material; adding water to the Stabilized Rice Bran material to produce a slurry; adding a beta-glucanase enzyme to the slurry; heating the slurry sufficiently to activate the beta-glucanase enzyme to create a soluble fiber fraction from the Stabilized Rice Bran material; and isolating the soluble fiber fraction. All of the aforementioned aspects may apply to these embodiments.

Also provided is a method of creating a nutritionally enhanced isolate of Stabilized Rice Bran, comprising the steps of: providing a Stabilized Rice Bran material; adding water to the Stabilized Rice Bran material to produce a slurry; adding a protease enzyme to the slurry; heating the slurry sufficiently to activate the protease enzyme to create a soluble protein fraction from the Stabilized Rice Bran material; and isolating the soluble protein fraction. The method may further comprise the steps of: adding a beta-glucanase enzyme to the slurry; heating the slurry sufficiently to activate the beta-glucanase enzyme to create a soluble fiber fraction from the Stabilized Rice Bran material; and isolating the soluble fiber fraction. Additionally, the method may further comprise the steps of: adding an alpha amylase enzyme to the slurry; heating the slurry sufficiently to activate the alpha amylase enzyme to convert starch in the Stabilized Rice Bran material into a soluble dextrin fraction; and isolating the soluble dextrin fraction.

The times, temperatures, and pH levels discussed above with respect to various embodiments of the nutritionally enhanced isolate of Stabilized Rice Bran may be used in connection with various embodiments of the disclosed method. Other aspects of the invention are disclosed herein as discussed in the following Detailed Description.

DETAILED DESCRIPTION

Following is a non-limiting written description of examples embodying various aspects of the invention. These examples are provided to enable a person of ordinary skill in the art to practice the full scope of the invention without having to engage in an undue amount of experimentation. As will be apparent to persons skilled in the art, further modifications and adaptations can be made without departing from the spirit and scope of the invention, which is limited only by the claims.

The enzyme alpha-amylase has been used to convert the starch component of SRB into a dextrin product lacking in protein, fat, and fiber content. The present invention overcomes this limitation by utilizing additional enzymes under a range of conditions to convert protein and fiber in the SRB to less complex fractions that can be isolated from insoluble fractions by screening and centrifuging. This new process is referred to herein as the Enhanced Enzyme Treatment and includes treating SRB slurries with certain enzymes in single or multiple process steps to facilitate isolation and inclusion of protein and fiber into the dextrin fraction from SRB. With the inclusion of the protein, fat, and fiber fractions, the yield of the finished product is significantly increased in quantity and improved in nutritional quality.

An example Enhanced Enzyme Treatment ("EET") is described below. Also, to demonstrate the effectiveness of Enhanced Enzyme Treatment on yield and nutritional profile of an SRB isolate, the enhanced isolate resulting from the example Enhanced Enzyme Treatment will be compared to a baseline isolate resulting from a Standard Enzyme Treatment ("SET") that uses only alpha-amylase. The baseline isolate resulting from the Standard Enzyme Treatment will be referred to as Standard Isolate ("SI"), while the enhanced isolate resulting from the example Enhanced Enzyme Treatment will be referred to as Nutritionally Enhanced Isolate ("NEI"). The Standard Enzyme Treatment will be described first, followed by a description of an example Enhanced Enzyme Treatment. The yield and nutritional profile of the resulting Standard Isolate and Nutritionally Enhanced Isolate will then be compared.

1. Example Standard Enzyme Treatment (SET)

In all of the following examples described in this specification, the Stabilized Rice Bran (SRB) was obtained from NutraCea, which has a location at 6720 N. Scottsdale Road, Suite 390, Scottsdale, Ariz. 85253. NutraCea's SRB is a shelf stable, USDA approved food-grade ingredient obtained from the vitamin rich outer layers of whole rice. Because nutrients contained in the outer layers of rice bran are very delicate, the rice bran is carefully milled and processed to maximize its freshness and retain its wholesomeness. While SRB from NutraCea was used in this example, the invention is not limited to use of that product, and it will be apparent to persons skilled in the art that other suitable SRB products can be used.

In this example Standard Enzyme Treatment, one-hundred grams of SRB was first hydrated to twenty percent solids by adding four hundred grams of water. The pH value of the resulting slurry measured 6.81 at 25° C. The slurry was then heated in a 1,000 milliliter glass beaker placed in a water bath set at 88° C. One gram of THERMOSTABLE AMYLASE HTL was added to the slurry to convert starch contained in the SRB into a low dextrose equivalent ("D.E.") dextrin.

In this example, the THERMOSTABLE AMYLASE HTL was obtained from BIO-CAT INC., located at 9117 Three Notch Road, Troy, Va. 22974. THERMOSTABLE AMYLASE HTL is an endo-amylase derived from a genetically modified strain of Bacillus licheniformis. This product exhibits high heat and low pH stability in starch hydrolysis and does not require additional calcium for operating under industrial liquefaction conditions. THERMOSTABLE AMYLASE HTL randomly hydrolyzes alpha-1,4-glucosidic bonds to reduce the viscosity of gelatinized starch and produce soluble dextrins and oligosaccharides. BIO-CAT INC. recommends a pH range of 5.5 to 5.8 for THERMOSTABLE AMYLASE HTL. The exact pH optimum may depend on process variables such as temperature, time, and substrate (both nature and concentration). BIO-CAT INC. recommends a temperature range of 105° C. to 110° C. for 5 to 7 minutes for primary liquefaction, and for secondary liquefaction a temperature range of 95° C. for 90 to 120 minutes (wet mill) and 85° C. to 93° C. for 90 to 120 minutes (dry mill). THERMOSTABLE AMYLASE HTL is supplied as a brown liquid that is standardized to not less than 17,400 LU/g. One Liquefon Unit (LU) is the measure of the digestion time required to produce a color change with iodine solution, indicating a definite stage of dextrinizotion of starch substrate under specified conditions. The optimum dosage of THERMOSTABLE AMYLASE HTL will vary with differences in substrate, pH, temperature, and processing time. While THERMOSTABLE AMYLASE HTL was used in this example, the invention is not limited to use of that product, and it will be apparent to persons skilled in the art that other suitable enzyme products can be used, including other alpha amylase enzyme products.

Returning to the description of the Standard Enzyme Treatment, once the dextrinized slurry reached 88° C., the slurry was stirred occasionally and held at that temperature for thirty minutes. The slurry was tested for residual starch using a standard iodine test. The test indicated no remaining starch in the slurry.

The slurry was then transferred to four fifty-milliliter centrifuge tubes to a starting weight of forty-five grams each. The four tubes were then placed in a high-speed centrifuge (International Equipment Company Model CS) and spun at 5,000 revolutions per minute for five minutes. The aqueous fraction containing the soluble isolates were decanted from each tube and recorded for weight. The aqueous fractions from each tube were then combined and tested for percent solids, percent fat and percent protein to determine baseline data for a Standard Isolate treated according to this Standard Enzyme Treatment. The results for these combined fractions of Standard Isolate are recorded in Table 1 as Sample 1.

A second Standard Enzyme Treatment of four centrifuge tubes were filled in the same manner from the same slurry beaker described above and were centrifuged in the same manner described above. The aqueous fractions from the tubes were combined and recorded as described above. The results for these second combined fractions of Standard Isolate treated according to the Standard Enzyme Treatment are recorded in Table 1 as Sample 2.

Another one-hundred gram SRB sample was prepared and treated in the same Standard Enzyme Treatment manner described above to produce two more sets of baseline centrifuged tests. The results for these third and fourth combined fractions of Standard Isolate are recorded in Table 1 as Samples 3 and 4. Samples 1 through 4 were then totaled, as shown below in Table 1:

TABLE 1

Standard Isolate (SI) From Standard Enzyme Treatment (SET)

| | Begin Wt. (g) | Decant Wt. (g) | % Solids | Dry Basis Weight | % As-Is Fat | % As-Is Protein |
|---|---|---|---|---|---|---|
| Sample 1 | 180 | 96 | 7.36 | 7.06 | 1.08 | 0.73 |
| Sample 2 | 180 | 100 | 7.38 | 7.38 | 1.28 | 0.86 |
| Sample 3 | 180 | 109 | 6.81 | 7.42 | 0.57 | 0.85 |
| Sample 4 | 180 | 110 | 7.01 | 7.92 | 0.80 | 0.86 |
| SI Totals/ Averages: | 720 | 415 | 7.14 | 7.45 | 0.93 | 0.83 |

2. Example Enhanced Enzyme Treatment (EET)

Next will be described an example Enhanced Enzyme Treatment (EET). Samples of Nutritionally Enhanced Isolate (NEI) were treated according to an Enhanced Enzyme Treatment (EET) in the following manner. One-hundred grams of SRB (described above) was treated with four-hundred grams of water to produce a twenty percent solids slurry in a 1,000 milliliter beaker. The pH value of the resulting slurry measured 6.81 at 25° C. To the slurry was added one gram of THERMOSTABLE AMYLASE HTL (described above), one gram of protease enzyme and one gram of beta-glucanase.

The protease enzyme used in this example was Promod™ 144 GL, obtained from Biocatalysts Limited, located at Cefn Coed, Parc Nantgarw, CF15 7QQ, Wales, UK. Promod™ 144GL is a food-grade botanical protease with at least five proteases of different specificity, and can be used to modify protein functionality in food systems. The biological source of Promod™ 144GL is Carica papaya. It has an Activity rating of 100 Papain TU, and is provided in liquid form. Promod™ 144GL is designed to perform in the pH range 5.0-7.5, and is active at temperatures of 50-70° C. according to Biocatalysts Limited. The exact level of application of Promod™ 144GL will depend on the protein substrate and the level of modification required. The degree of hydrolysis resulting from action upon a particular protein or protein system will be influenced by enzyme dose, pH, time and temperature. Trials are recommended to determine exact conditions for desired effect. For different degrees of hydrolysis, Biocatalysts Limited makes the following recommendations: high: 70-100 units/kg; moderate: 40-70 units/kg; and low: 20-50 units/kg based on protein weight. Varying pH, time and temperature can also influence the result. While Promod™ 144GL was used in this example, the invention is not limited to use of that product, and it will be apparent to persons skilled in the art that other suitable enzyme products can be used, including other protease enzyme products.

The beta-glucanase used in this example was Depol™ 686L, also obtained from Biocatalysts Limited, identified above. Depol™ 686L is a food-grade broad-spectrum carbohydrase containing beta-glucanase and xylanase. The biological source of Depol™ 686L is Trichoderma sp. It has an Activity rating of 5,000 U/g (beta-glucanase), and is provided in the form of a brown liquid. Depol™ 686L is designed to perform in the pH range 3.0-6.5, and is active at temperatures of 50-65° C., according to Biocatalysts Limited. Heating the slurry sufficiently to activate the beta-glucanase enzyme will release the bound fat and protein components from the insoluble fiber fraction of the SRB slurry, thereby increasing the total amount of fat and fiber contained in the soluble fraction over and above the baseline process. Trials are recommended to determine exact conditions for desired effect. While Depol™ 686L was used in this example, the invention is not limited to use of that product, and it will be apparent to persons skilled in the art that other suitable enzyme products can be used, including other beta glucanase enzyme products.

Returning now to the description of the Enhanced Enzyme Treatment, the pH value of the slurry after these additions measured 6.55 at 25° C. The slurry was then heated to 77° C. for thirty minutes and then raised to 88° C. and held for five minutes. The slurry was checked using an iodine test to determine that no starch remained in the slurry.

Four fifty-milliliter centrifuge tubes were filled with forty-five grams of slurry each and spun in a high-speed centrifuge (International Equipment Company Model CS) for five minutes at 5,000 revolutions per minute. The aqueous fraction, containing the soluble isolate, from each tube was decanted and weighed. The aqueous fraction from each tube was then combined and tested for percent solids, percent fat and percent protein to generate data for the Nutritionally Enhanced Isolate treated with the above example Enhanced Enzyme Treatment. The results for these combined fractions of Nutritionally Enhanced Isolate treated according to this example Enhanced Enzyme Treatment are recorded in Table 2 as Sample 1'.

A second Enhanced Enzyme Treatment of four centrifuge tubes were filled in the same manner from the same Enhanced Enzyme Treatment slurry beaker and centrifuged in the same Enhanced Enzyme Treatment manner described above. The aqueous fraction from each tube was combined and recorded as previously discussed. The results for these second combined fractions of Nutritionally Enhanced Isolate treated according to this example Enhanced Enzyme Treatment are recorded in Table 2 as Sample 2'.

Another one-hundred gram SRB sample was prepared and treated in the same Enhanced Enzyme Treatment manner described above to produce two additional sets of centrifuged tests. The results for these third and fourth combined fractions of Nutritionally Enhanced Isolate are recorded in Table 2 as Samples 3' and 4.' Samples 1' through 4' were then totaled, as shown below in Table 2:

TABLE 2

Nutritionally Enhanced Isolate (NEI) From Enhanced Enzyme Treatment (EET)

| | Begin Wt. (g) | Decant Wt. (g) | % Solids | Dry Basis Weight | % As-Is Fat | % As-Is Protein |
|---|---|---|---|---|---|---|
| Sample 1' | 180 | 109 | 11.48 | 12.51 | 2.40 | 2.54 |
| Sample 2' | 180 | 113 | 11.65 | 13.16 | 2.43 | 2.55 |
| Sample 3' | 180 | 115 | 11.14 | 12.81 | 2.60 | 2.72 |
| Sample 4' | 180 | 115 | 11.37 | 13.08 | 2.55 | 2.78 |
| NEI Totals/ Averages: | 720 | 452 | 11.41 | 12.89 | 2.50 | 2.65 |

Table 3 compares the NEI Totals from Table 2 to the SI Totals from Table 1. As clearly indicated in Table 3, the NEI Totals from the example Enhanced Enzyme Treatment were substantially higher than the SI Totals from the Standard Enzyme Treatment. Accordingly, applying an Enhanced Enzyme Treatment town SRB isolate substantially increases yield and improves nutritional profile over and above applying Standard Enzyme Treatment. For example, but not by way of limitation, applying the above example Enhanced Enzyme Treatment to an SRB isolate increased decanted weight by 8.9 percent, increased solids by 59.8 percent, and increased dry basis weight by 73.1 percent, over and above applying Standard Enzyme Treatment. And with regard to nutritional profile, applying Enhanced Enzyme Treatment to an SRB isolate increased the yield of fats by 167.6 percent and the yield of proteins by 220.9 percent, over and above applying Standard Enzyme Treatment, as shown below in Table 3:

TABLE 3

Improvement Of Nutritionally Enhanced Isolate (NEI) Over Standard Isolate (SI)

| | Begin Wt. (g) | Decant Wt. (g) | % Solids | Dry Basis Weight | % As-Is Fat | % As-Is Protein |
|---|---|---|---|---|---|---|
| NEI Totals/ Averages less SI Totals/ Averages: | 0 | 37 | 4.27 | 5.445 | 1.5625 | 1.8225 |
| NEI's % Increase Over SI | 0.0% | 8.9% | 69.8% | 73.1% | 167.6% | 220.9% |

The percentage increases reported above in Table 3 were calculated using data having more significant figures than reported in Tables 1 and 2. Thus, while the percentage increases reported above are accurate, an attempt to recreate them using the data in Tables 1 and 2 will lead to minor rounding differences.

As will be apparent to persons skilled in the art, modifications and adaptations may be made to the example Enhanced Enzyme Treatment described above. For example, but not by way of limitation, one or more different enzymes can be introduced to the slurry in addition to, or instead of, the example enzymes described herein. For instance, a cellulase enzyme could be used, or any other suitable fiber and/or protein and/or fat-solublizing enzyme(s). Further, the type of enzyme(s) and their relative dose(s) can be varied. Also, the enzyme(s) can be introduced in a different form or phase at the same or different points in the process, and other variables can be adjusted as will be apparent to persons skilled in the art, including, pH, times, and temperatures. For example, in certain embodiments pH can be selected in the range from 5.5 to 5.8, while in other embodiments pH can be selected in the range from 5.0 to 7.5, while in yet other embodiments pH can be selected in the range from 3.0 to 6.5, and in still other embodiments pH can be selected in the range from 3.0 to 7.5. In one embodiment the pH is selected in the range 6.0 to 7.0. The invention is not limited to these pH ranges, however, unless specifically claimed. Trials are recommended to determine exact conditions for desired effect.

Regarding time and temperature, in the example Enhanced Enzyme Treatment described above, the slurry was heated to 77° C. (the first temperature) for thirty minutes (the first time) and then raised to 88° C. (the second temperature) and held for five minutes (the second time). Alternatively, in certain embodiments the first temperature can be selected in the range from 50° C. to 65° C., while in other embodiments the first temperature can be selected in the range from 50° C. to 70° C., while in yet other embodiments the first temperature can be selected in the range from 105° C. to 110° C., and in still other embodiments the first temperature can be selected in the range from 50° C. to 110° C. In one embodiment the first temperature is selected in the range from 57° C. to 97° C. Additionally, in certain embodiments the second temperature can be higher than, lower than, or the same as the first temperature. More specifically, in certain embodiments the second temperature can be selected in the range from 50° C. to 65° C., while in other embodiments the second temperature can be selected in the range from 50° C. to 70° C., while in yet other embodiments the second temperature can be selected in the range from 105° C. to 110° C., and in still other embodiments the second temperature can be selected in the range from 50° C. to 110° C. In one embodiment the second temperature is selected in the range from 68° C. to 108° C. The first and second times can each be varied in certain embodiments to be longer or shorter in duration than the other time, or the first and second times may have the same duration. In certain embodiments the first and second times can each be selected in the range from 1 minute to 120 minutes. In one embodiment the first time is selected in the range from 15 to 45 minutes, and the second time is selected in the range from 1 to 10 minutes. Additional time durations (e.g., third, fourth, etc.) at various temperatures may be added, and/or any appropriate time-temperature curve or other shape may be used. The invention is not limited to any of the foregoing time or temperature ranges unless specifically claimed. Trials are recommended to determine exact conditions for desired effect. As understood in the art, references in the claims to isolating the various fractions does not require that all of the available material be isolated.

All publications, patents and patent applications mentioned in this specification are herein incorporated by reference into this specification in their entireties for all purposes. As will be apparent to persons skilled in the art, modifications and adaptations to the above-described invention can be made without departing from the spirit and scope of the invention, which is defined only by the following claims.

The invention claimed is:

1. A nutritionally enhanced isolate of stabilized rice bran prepared by a process comprising the steps of:
   providing a stabilized rice bran material;
   adding water to the stabilized rice bran material to produce an aqueous slurry including an insoluble fiber fraction;
   adding to the slurry a combination of enzymes consisting essentially of:
      a-beta-glucanase enzyme;
      a thermotolerant protease enzyme mix derived from *Carica papaya*; and
      a thermostable alpha amylase enzyme;
   heating the slurry sufficiently to activate said combination of enzymes;
   wherein the slurry has a pH in the range 6.0 to 7.0;
      isolating from the slurry fat and protein components that were released from the insoluble fiber fraction, and soluble dextrin that was converted from starch in the stabilized rice bran material;
      wherein said stabilized rice bran comprises from 0.86 to 2.78 percent as-is protein, and from 0.93 to 2.5 percent as-is fat.

2. A method of creating a nutritionally enhanced isolate of stabilized rice bran, comprising the steps of:
   providing a stabilized rice bran material;
      adding water to the stabilized rice bran material to produce an aqueous slurry including an insoluble fiber fraction;
      adding to the slurry a combination of enzymes consisting essentially of:
         a-beta-glucanase enzyme;
         a thermotolerant protease enzyme mix derived from *Carica papaya*; and
         a thermostable alpha amylase enzyme;
      heating the slurry sufficiently to activate said combination of enzymes;
   wherein the slurry has a pH in the range 6.0 to 7.0;
      isolating from the slurry fat and protein components that were released from the insoluble fiber fraction, and soluble dextrin that was converted from starch in the stabilized rice bran material;
      wherein said stabilized rice bran comprises from 0.86 to 2.78 percent as-is protein, and from 0.93 to 2.5 percent as-is fat.

3. The nutritionally enhanced isolate of claim 1, wherein said protease comprises papain.

4. The nutritionally enhanced isolate of claim 1, wherein said protease comprises papain protease, glycyl endopeptidase, papaya protease, and chymopapain protease.

5. The method of claim 2, wherein said protease comprises papain.

6. The method of claim 2, wherein said protease comprises papain protease, glycyl endopeptidase, papaya protease, and chymopapain protease.

* * * * *